Oct. 21, 1958  A. J. ROGER ET AL  2,856,923
SYRINGE
Filed Oct. 22, 1954
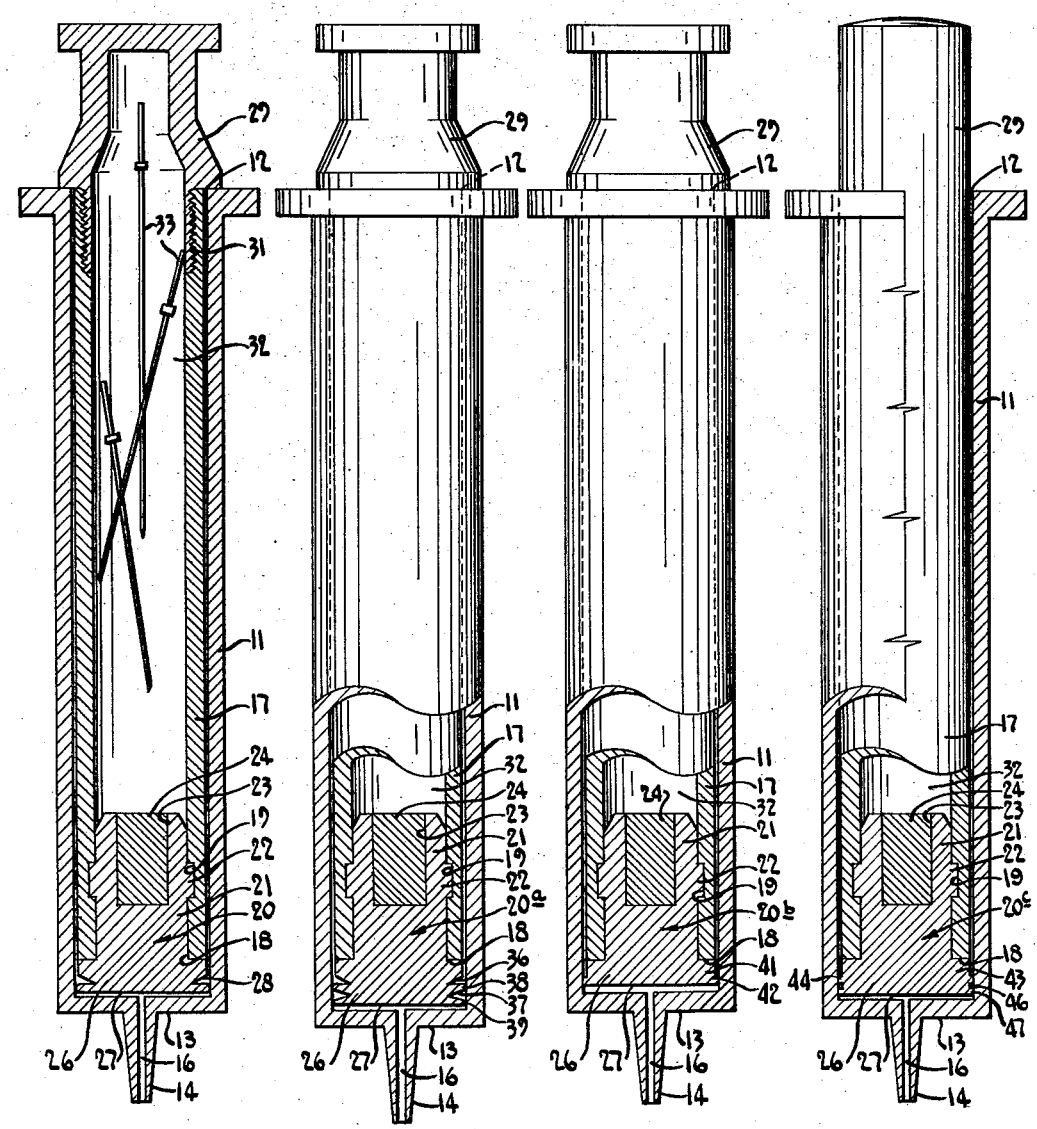
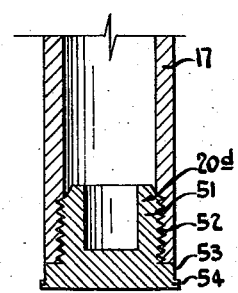
INVENTORS
LEO BAUM AND
BY   ALBERT J. ROGER
Townsend, Townsend & Hoppe
ATTORNEYS

United States Patent Office 2,856,923
Patented Oct. 21, 1958

2,856,923

SYRINGE

Albert J. Roger and Leo Baum, Oakland, Calif.; said Roger assignor to said Baum

Application October 22, 1954, Serial No. 463,989

6 Claims. (Cl. 128—218)

This invention relates to a new and improved syringe of the type for injecting fluids. The invention has particular reference to the construction of the piston, barrel and gasket for such a syringe. Reference is made to the copending patent application of Leo Baum and Eugene D. Sweetland, Serial No. 447,320, filed August 2, 1954, for Syringe.

The present invention employs a barrel or cylinder preferably of a transparent or translucent material such as nylon resin. Within the barrel is a piston which may be formed of nylon or other suitable material. In order to provide a tight seal between the piston and the barrel, a gasket is employed. Such gasket may be formed of silicone gum rubber, neoprene, Hypalon (chlorosulfonated polyethylene) or the like. Such gaskets must have the ability to withstand temperatures of sterilization and yet retain their resiliency and flexibility in order to perform their function of sealing the piston to the barrel as the piston is raised to draw the fluid into the barrel and as the piston is depressed to expel the fluid to the hypodermic needle, or the like, employed with the syringe.

One of the features of the present invention is the fact that the end of the piston is hollow or recessed and that the gasket fits into the recess, plugging the end of the piston and at the same time providing a seal between the piston and the barrel.

Another feature of the invention is the provision of means for locking the gasket in the recess in the piston.

Syringes heretofore produced employ a circumferential groove in the cylindrical surface of the piston in which fits a resilient ring. One advantage of the invention resides in the fact that no groove and ring are employed and, therefore, there is no possibility of any foreign matter being trapped in the groove under the ring.

Another feature of the invention is the fact that the barrel is transparent or translucent and the gasket is of a dark color which is visible through the barrel and therefore the images of the gasket accurately mark the actual lower end of the piston.

One of the most important features of the invention is the ease of operation of the device, inasmuch as the gasket is able to bulge or compress as operating conditions of the syringe necessitate. It will be understood that the device does not operate under the constant radial pressure of the resilient gasket of syringes previously used in which a ring is recessed in a groove in the piston, and the absence of such pressure improves the operation of the device.

One of the most important features of the invention is the fact that the shape of the gasket insofar as it contacts the surface of the barrel acts as a squeegee and accurately and effectively seals against the inside of the barrel to fill and empty the syringe effectively.

Other objects of the present invention will become apparent upon reading the following specification and referring to the accompanying drawings in which similar characters of reference represent corresponding parts in each of the several views.

In the drawings:

Fig. 1 is a vertical section through one form of the device.

Fig. 2 is a plan of the device partly broken away in section to show the interior construction, the form of the gasket in Fig. 2 being slightly modified over Fig. 1.

Fig. 3 is a view similar to Fig. 2 showing still another form of gasket.

Fig. 4 is a view similar to Fig. 2 showing a still further form of gasket.

Fig. 5 is a fragmentary sectional view of the end of the piston showing a modified means of securing a gasket in the piston.

As illustrated herein, a conventional transparent or translucent barrel 11 of such material as nylon resin is employed. The inner surface of the barrel is accurately shaped in cylindrical form. The upper end 12 of the barrel is open for the insertion of the piston and the lower end 13 of the barrel is closed except for the provision of a canal 16 which passes through the center of the end of the barrel and through a tapered connection 14 which communicates with the hollow needle commonly attached to syringes.

Fitting within the barrel 11 and of slightly smaller diameter is a piston 17. The lower end 18 of the piston is open or recessed for the insertion of a sealing gasket 20 as hereinafter set forth. A groove 19 in the cylindrical surface of the recess in piston 17 is located spaced upwardly from open end 18 thereof and provided for the purpose of anchoring the gasket 20.

The plug portion 21 of the gasket 20 comprises the upper end thereof and is of an outer diameter substantially equal to the inner diameter of the hollow open end 18 of the piston 17. An external cylindrical ring 22 on the plug portion 21 is of a diameter equal of the inner diameter of the groove 19 and is shaped complementary to the groove. A hollow 23 is formed in the upper end of the plug 21 so that the upper end of the plug can be collapsed to permit the plug 21 to be inserted through the open end 18 of the piston until the ring 22 seats in the groove 19. A thermo setting plastic substance 24 of any conventional type may be used to fill the hollow 23, and once the substance 24 sets in the hollow 23, the ring 22 is securely locked in the groove 19 so that the plug 21 cannot be removed from the piston. Plaster of Paris or other substance which sets upon hardening may be used for the substance 24. The substance 24 is characterized by the fact that it is fluid initially and then sets up hard after treatment, such treatment being heat treatment, aging, wetting and evaporation, etc.

Below the open end 18 of the piston, the gasket 20 has an enlarged portion 26 having a diameter substantially equal to that of piston 17. The lower end 27 of portion 26 is flat and transverse to the axis of the piston 17. Below portion 26 is a groove 28 formed in the cylindrical outer surface of the gasket external of piston 17. Below groove 28 the outer diameter of the enlarged portion or blade 26 is substantially equal to the inner diameter of the barrel 11 so that there is a tight fit between the gasket 20 and the barrel 11 to insure proper intake and expulsion of fluid. The shape of the groove shown in Fig. 1 comprises a V-shaped groove 28 in the cylindrical outer diameter of the enlarged portion 26 of the gasket 20.

The gasket 20 is formed of a flexible, resilient substance such as silicone gum rubber, neoprene, chlorosulfonated polyethylene or other suitable material. One of the characteristics of such material is that they can withstand the high temperature required for sterilizing the syringe without losing its resiliency. Another characteristic of the material is the fact that it is not affected by the solvents or other ingredients employed in hypodermic syringe fluid.

The upper end of the piston 17 is provided with an enlarged cap 29 which is shaped so that it may conveniently be grasped by the fingers of the user and which is so positioned that when the cap 29 seats against the upper end of the barrel 11 the end 27 of the gasket 20 is substantially in contact with the end 13 of the barrel. As illustrated in Fig. 1, the cap 29 may be removable from the hollow piston 17 by the provision of screw threads 31 on the cap and upper end of the piston. Thus, the hollow 32 in the piston may be used for storage of needles 33 or the like.

In Fig. 2, a somewhat modified form of gasket 20a is illustrated. A first V-shaped groove 36 is formed in the enlarged lower end 26 of the gasket 20a, the gasket 20a above the groove 36 being of the diameter substantially equal to the diameter of the piston 17. A second V-shaped groove 37 is formed below the groove 36 of substantially the same size and shape. Thus, a flexible, resilient blade 38 is provided between the two grooves 36 and 37 having an external diameter such as to engage the interior wall of the barrel 11 securely. Below the groove 37 is the enlarged diameter portion 39 which provides a second blade 39 similar to the blade 38. As will be seen from the accompanying drawings, the difference between the gaskets shown in Figs. 1 and 2 is the provision of two blades 38 and 39 to replace the single blade shown in Fig. 1. In other respects the two syringes are substantially identical.

As illustrated in Fig. 3, no grooves corresponding to the grooves 28, 36 and 37 of the previous modifications are employed. Below the open end 18 of the piston 17, the gasket 20b employs a portion 41 which has a diameter substantially equal to the external diameter of the piston 17—i. e., slightly less than the inner diameter of the barrel 11. Below the portion 41 is an enlarged diameter portion 42 which has an external diameter such that a firm contact is created between the portion 42 and the inside diameter of the barrel 11.

In Fig. 4, another modified form of gasket 20c is employed. In such gasket the portion 43 immediately below the open end 18 of the piston 17 is of a diameter substantially equal to the external diameter of the piston 17 and hence slightly less than the internal diameter of the barrel 11. Immediately below the portion 43 is a first blade 44 which is of a diameter such as to create a firm contact against the internal diameter of the barrel 11, the first blade 44 being an annular ring around the enlarged portion 26 of the gasket 20c. Below the first blade 44 is a groove 46 which is square in cross-section having a depth such that the bottom of the groove has a diameter substantially equal to the portion 43. Below the groove 46 is a second blade 47 having a diameter substantially equal to that of the first blade 44 and being generally similar thereto. Thus, the blades 44 and 47 cooperate to secure proper action of the gasket to seal the piston 17 and barrel 11.

In Fig. 5 means for anchoring the gasket 20d is illustrated. In this modification, a more rigid material is employed in the construction of the gasket 20d. The interior of the hollow end of the piston 17 is threaded and the exterior of plug portion 51 of the gasket 20d is formed with mating threads. Externally of the open end 18 of the piston 17 is small diameter portion 53 of the gasket 20d which diameter is equal to the external diameter of the piston 17. Below the portion 53 is a ridge 54 of a diameter such as to firmly engage the interior of the barrel (not shown). The exact shape of the grooves and blades in the portion 54 may be any of the types shown in Figs. 1 to 4, inclusive, as will be well understood by one skilled in the art.

Although the foregoing invention has been described in some detail by way of illustration and example for purposes of clarity of understanding, it is understood that certain changes and modifications may be practiced within the spirit of the invention and scope of the appended claims.

What is claimed is:

1. In a syringe, a barrel, one end of said barrel being formed with a substantially closed end provided with a discharge aperture, a piston slidable in said barrel and having a lesser diameter than the inner diameter of said barrel, said piston being formed with a recess in its end adjacent said closed end of said barrel, a plug arranged to fit in said recess, said plug being formed with a blade located externally of said piston, said blade having an enlarged diameter to engage the interior of said barrel with a tight fit, said recess being formed with an internal groove and said plug with a complementary ring, the inner end of said plug being formed with a hollow to a depth from said inner end at least equal to the distance of said ring from said inner end and there being further provided a filler for said hollow characterized by the fact that it is fluid initially and sets up hard upon treatment.

2. A syringe according to claim 1, in which said blade is defined in part by a V-shaped circumferential groove in said plug.

3. A syringe according to claim 1, in which there is provided a circumferential groove above said first-mentioned blade and a second blade above said circumferential groove.

4. In a syringe, a barrel, one end of said barrel being formed with a substantially closed end provided with a discharge aperture, a piston slidable in said barrel and having a lesser diameter than the inner diameter of said barrel, said piston being formed with a recess in its end adjacent said closed end of said barrel, a plug arranged to fit in said recess, and said plug being formed with a groove spaced inwardly proximate the end thereof in slidable contact with the interior of said barrel to form a fluid seal therebetween, said blade having an enlarged diameter to engage the interior of said barrel with a tight fit, said recess being formed with an internal groove and said plug with a complementary ring.

5. In a syringe, a barrel, one end of said barrel being formed with a substantially closed end provided with a discharge aperture, a piston slidable in said barrel and having a lesser diameter than the inner diameter of said barrel, said piston being formed with a recess in its end adjacent said closed end of said barrel, a plug arranged to fit in said recess, said plug being formed with a first blade located externally of said piston, said first blade having an enlarged diameter to engage the interior of said barrel with a tight fit, a second blade formed on said plug above said first blade and spaced therefrom, said second blade having an enlarged diameter to engage the interior of said barrel with a tight fit, said blades being separated by a pair of spaced circumferential grooves, said recess being formed with an internal groove and said plug with a complementary ring, the inner end of said plug being formed with a hollow to a depth from said inner end at least equal to the distance of said ring from said inner end and there being further provided a filler for said hollow characterized by the fact that it is fluid initially and sets up hard upon treatment.

6. A syringe according to claim 5, in which said circumferential grooves are V-shaped.

References Cited in the file of this patent

UNITED STATES PATENTS

| 2,419,401 | Hinds | Apr. 22, 1947 |
| 2,666,434 | Ogle | Jan. 19, 1954 |

FOREIGN PATENTS

| 580,185 | Great Britain | Aug. 29, 1946 |
| 888,600 | Germany | July 9, 1953 |
| 1,041,436 | France | May 27, 1953 |